United States Patent
Gadre (10) Patent No.: US 11,090,813 B2
(45) Date of Patent: Aug. 17, 2021

(54) AUGMENTED REALITY INTERFACE TO ROBOTS

(71) Applicant: BROWN UNIVERSITY, Providence, RI (US)

(72) Inventor: Samir Yitzhak Gadre, Prospect, KY (US)

(73) Assignee: Brown University, Providence, RI (US)

(*) Notice: Subject to any disclaimer, the term of this patent is extended or adjusted under 35 U.S.C. 154(b) by 0 days.

(21) Appl. No.: 17/054,323

(22) PCT Filed: May 10, 2019

(86) PCT No.: PCT/US2019/031817
§ 371 (c)(1),
(2) Date: Nov. 10, 2020

(87) PCT Pub. No.: WO2019/217885
PCT Pub. Date: Nov. 14, 2019

(65) Prior Publication Data
US 2021/0162605 A1    Jun. 3, 2021

Related U.S. Application Data (60) Provisional application No. 62/670,318, filed on May 11, 2018.

(51) Int. Cl.
| | | |
|---|---|---|
| *B25J 13/08* | (2006.01) | |
| *G06F 13/40* | (2006.01) | |
| *G03H 1/00* | (2006.01) | |
| *G06F 3/16* | (2006.01) | |

(52) U.S. Cl.
CPC .......... *B25J 13/08* (2013.01); *G06F 13/4027* (2013.01); *G03H 1/0005* (2013.01); *G06F 3/167* (2013.01)

(58) Field of Classification Search
CPC .............. B25J 13/08; G06F 13/4027; G05B 2219/32014; G05B 2219/40131; G05B 2219/36184; G05B 2219/40391; G05B 2219/40395
See application file for complete search history.

(56) References Cited

U.S. PATENT DOCUMENTS

| | | |
|---|---|---|
| 8,639,644 B1 | 1/2014 | Hickman et al. |
| 2016/0034809 A1 | 2/2016 | Trenholm et al. |
| 2020/0030979 A1* | 1/2020 | Bank ........................ B25J 13/08 |

OTHER PUBLICATIONS

Quigley et al. "Programming Robots With ROS" O'Reilly Media, Inc.; Publication [online]. Dec. 2015. [retrieved Aug. 27, 2019]. Retrieved from the Internet<URL: http://marte.aslab.upm.es/redmine/files/dmsf/p_drone-testbed/170324115730_268_Quigley_-_Programming_Robots_with_ROS.pdf>, pp. 1-447.

Sita et al. "Towards Multimodal Interactions: Robot Jogging in Mixed Reality"; VRST; Publication [online]. Nov. 2017. [retrieved Jul. 11, 2019]. Retrieved from the Internet: <URL: http://eprints.uwe.ac.uk/33810/1/VRST-poster-SITA-final.pdf>, pp. 1, 2.

International Search Report and Written Opinion dated Sep. 16, 2019 for PCT/US2019/031817.

* cited by examiner

*Primary Examiner* — Dale Moyer
(74) *Attorney, Agent, or Firm* — Adler Pollock & Sheehan P.C.

(57) ABSTRACT

A system includes a robot, a ROS base station, and a holocontrol client, the robot communicatively linked to the ROS base station and the ROS base station communicatively linked to the holocontrol client.

3 Claims, 8 Drawing Sheets

(a) The start position with a superimposed transparent control sphere.

FIG. 1A

(b) The arm is teleoperated downwards to clamp the cup.

FIG. 1B

(c) *The user continues to manipulate the sphere to pick up the cup.*

FIG. 1C

(a) *The start state of the arm, where the sphere is initially clicked.*

FIG. 2A (b) *An Intermediate CP point after start. Notice that the position during the first CP is saved for visualization.*

FIG. 2B (c) *A third CP is saved, in this case, at the stop location.*

AUGMENTED REALITY INTERFACE TO ROBOTS

CROSS REFERENCE TO RELATED APPLICATIONS

This application is a national phase filing under 35 U.S.C. § 371 of International Application No. PCT/US2019/031817 filed May 10, 2019, which claims benefit from U.S. Provisional Patent Application Ser. No. 62/670,318, filed May 11, 2018, the entire contents of which are hereby incorporated by reference herein in their entirety.

STATEMENT REGARDING GOVERNMENT INTEREST

None.

BACKGROUND OF THE INVENTION

The present invention relates generally to robotics, and more particularly an augmented reality interface to robots.

As robots become integrated into everyday life, it will be necessary to develop channels for humans to teach machines with actions and words rather than with programming languages. Learning from Demonstration (LfD) fills this void, in that it allows people to each robots with their own actions. While there is room for algorithmic improvement within the field of LfD, training interfaces are a major bottleneck.

Existing training methods are often not scalable. Current approaches involve moving joints by hand or via 2D graphical user interfaces (GUIs). However, physically manipulating a robot is not always practical as the robot can be large, heavy, or its operating environment dangerous. For example, robots are useful in high radiation environments where humans cannot travel safely. If someone wanted to teach a robot a new skill in such an environment, it would be better to do so virtually. 2D GUIs are in wide use but require an external monitor, split attention between robot and screen, and are awkward to use.

Traditional methods also put strain on teachers to iterate on their teaching style and provide completely new demonstrations to clear up ambiguity. This is particularly a problem if the teacher is unskilled. Currently, it is also hard to visualize what a robot has learned prior to actual execution. So, it is difficult for a teacher to detect and prevent failure.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a system including a robot, a ROS base station, and a holocontrol client, the robot communicatively linked to the ROS base station and the ROS base station communicatively linked to the holocontrol client.

In another aspect, the invention features a method including placing a mixed reality hologram of a robot on top of a physical robot, a position of hologram maintained by a head mounted device, moving a holographic sphere that appears on the robot end-effector that moves the real end-effectors, collecting data for many skills within a demonstration, generating a different motion plan for each skill, processing the collected data using a bias least fit method in which critical points are weighted more heavily, the critical points representing states in the demonstration that are critical to performing a skill, editing the endpoints of the skills, and executing the motion plans.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE INVENTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

We are concerned with the problem of allowing humans to train robots without having to worry about low-level implementation details. The present invention is based on a procedure called Learning from Demonstration (LfD).

In LfD, we model the world as a Markov Decision Process (MDP). The goal is to learn a policy π, as defined in (1), which describes how to act in the MDP to maximize a reward function (minimize a loss function).

$$\pi: S \to A. \qquad (1)$$

Here $S \subseteq Rn$ is the set of states that the agent can take, where each state is represented by an n dimensional vector. $A \subseteq Rm$ is the set of actions the robot can take, where each action is represented by an m dimensional vector. Transitions between states are modeled by a probabilistic transition function T:

$$T(s'|s,a): S \times A \times S \to [0,1]. \qquad (2)$$

T gives the probability of being in current state s $0 \in S$ given the previous state $s \in S$ and the action $a \in A$ taken at s. There is a set of demonstration examples E for a skill, where $e_i \in E$ represents the i-th example. Each example trajectory ei then is the sequence shown in (3) with k observations:

$$e_i = [(s_1^i, a_1^i), (s_2^i, a_2^i), \ldots, (s_k^i, a_k^i)]. \tag{3}$$

Here $s_j^i \in S$ is the j-th observed state and $a_j^i \in A$ is the i-th observed action in example trajectory $e_i$. By training on F, the goal is to reproduce the policy that generated the example trajectories:

$$\pi^*: S \rightarrow A. \tag{4}$$

Given this framework, there are many experimental and algorithmic choices to be made—for example the representation of observations and the action spaces, which determine the demonstration space. One might use all reachable coordinates $(x, y, z) \in R^3$ to represent the observation space and the corresponding displacement vectors (dx, dy, dz) between any two observations to define the set of actions.

Whereas the above formulation lets us decide what information to collect, the teacher and robot relationship determines how the demonstrations will be collected. One common approach is to use kinesthetic teaching where a teacher manipulates a robot while it records observations about its state. This kind of demonstration has been used to learn striking motions for table tennis. Other popular approaches use teleoperation and mimicking. In the former, a human demonstrates a motion by moving the robot via a controller. In the latter, a rig might be used so a human's motion is captured for robotic imitation. A mapping between human and robot joints is then used. Mimicking has been show to be effective method to teach hand and arm movements. Once E is collected, supervised learning is often used to learn $\pi^*$.

Dynamic Movement Primitives (DMPs) are a type of policy often used with LfD. They were first formulated as a control mechanism for decoupled degrees of freedom (DOFs) and take inspiration from the mechanics of a damped spring. The following is one formulation of DMPs:

$$\tau v = P(g-x) - Dv + (g-x_0)f, \tag{5}$$

$$\tau \dot{x} = v, \tag{6}$$

where $x_0$ is the start, x is the current position, g is the goal, v is the velocity, $\tau$, D, and P are scaling factors, and $f$ is a non-linear forcing function. The system is loosely non-linear. Without the $f$ term, (1) represent the linear dynamics of a spring-damper. The linear portion of (1) is essentially a PD controller governed by parameters P and D, where P is the proportional gain and D scales the damping term. In practice, it is important that D is set such that the spring analog is critically damped to preventing oscillations. The linear portion of (1) ensures that we steadily make progress from x to g. The function $f$ takes the following form and determines the shape of the curve we take from $x_0$ to g:

$$f(\phi) = \frac{\sum_{i=1}^{n} \psi_i(\phi) \omega_i \phi}{\sum_{i=1}^{n} \psi_i(\phi)}. \tag{7}$$

$\varphi$ is a phase variable, each is a basis function such as the Radial or Fourier basis. Each $w_i$ is a weight that can be learned using supervised regression methods on a set of training examples E. The number n of basis functions captures the trade-off between being able to represent more complex functions and over-fitting on E as n becomes larger.

In the present invention keyframes are useful in a LfD framework. Here keyframes are taken to be a sparse set of data points, such that moving from point to point will complete the desired task. We created Critical Points (CPs), which are states in the demonstration that are critical to performing a skill. We also use 2D GUIs to allow for "adaptation" after training, where a teacher is able to tweak a demonstration offline to create more robust motion plans. MR is an effective platform for robots to communicate future movements to human trainers. Time-lapse animation of a robot arm's motion in MR are displayed so a human observer can understand the intent of the robot. Furthermore the use of MR has obvious safety benefits, both for the robot and for the teacher. By training and simulating on a hologram, it is possible to isolate failure modes.

Our invention includes keys elements referred to as calibration, representation, demonstration, data processing, and execution to address the task of allowing a teacher to train a manipulator to autonomously perform pick and place objectives' of of the elements are fully described below, wherein calibration takes place by moving a hologram of the robot onto the real robot. The representation section presents our choices of state and action spaces. The demonstration section discusses how the MR system is used to collect a demonstration. The data processing section addresses the preprocessing on a demonstration before a policy is created. Finally, the execution section explains how a user gets the robot to generalize demonstrated motion trajectories.

Calibration

We rely on two main coordinate systems, the Unity coordinate system U and the ROS coordinate system R. Both have position (x, y, z), orientation (r, p, y), and equivalent scales. U and R are global frames for the HoloLens application and Baxter respectively. The origin of U is determine by the position and orientation of the HoloLens at the start of the application. The origin of R is determined by the base link of the Baxter robot (also referred to as "Baxter"), which is located at the center of the robot's torso. Hence there is a critical calibration step in which the user must, implicitly, determine the transforms between these two frames. We solve this problem by having a holographic rendering of the robot, dubbed the shadow, appear with its base link at the origin of U. The shadow is initialized such that it has all of the same joint angles as the real robot. The user is tasked with calibrating the system by moving the shadow until it is flush with the real robot, thereby generating the a transform Tf and $Tf^{-1}$:

$$Tf: u \rightarrow R, \tag{8}$$

Representation

The state of the robot arm is specified by the position of the Baxter end-effector in R concatenated with two booleans g and cp. It is easy to find the location of the end-effector in the R by applying successively transforms that start at the base link and move through the Baxter arm. g takes value 1 if the gripper is open and 0 otherwise. cp takes value 1 if the user determines the position is a CP in the demonstration and 0 otherwise. Here a CP is used as a key-point or support for the demonstration, signifying that the particular state achieved is crucial to the integrity of the demonstrated skill.

Actions are displacement vectors that take the end effector from starting state s to next state s' over a timestep. The timestep is determine by the frame rate of our Unity application as well as networking speed that enables connection between the holographic application and the Baxter base station. A sequence of observations of states and actions over multiple timesteps constitutes a demonstration.

Demonstration

Figure 1A:
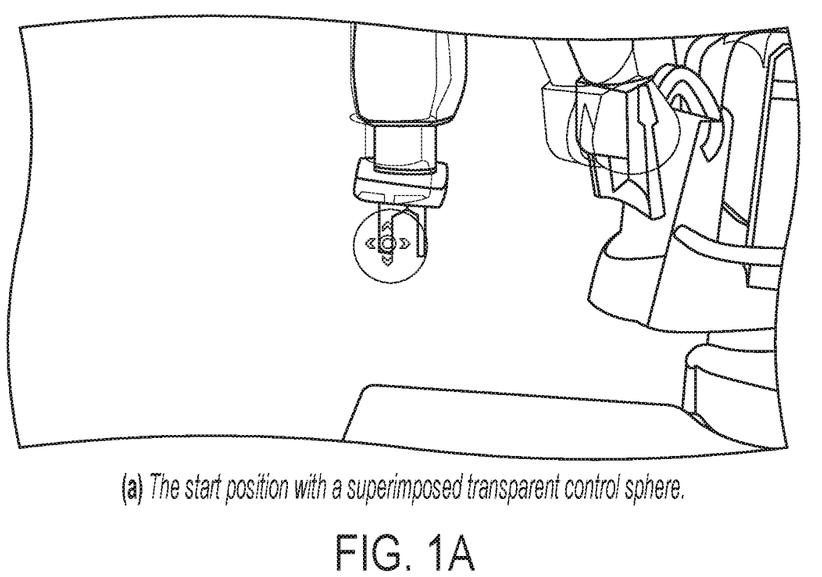
FIG. 1A, FIG. 1B and FIG. 1C illustrate an example of an exemplary teleoperation to pick up a cup using the system of the present invention.
Figure 1B:
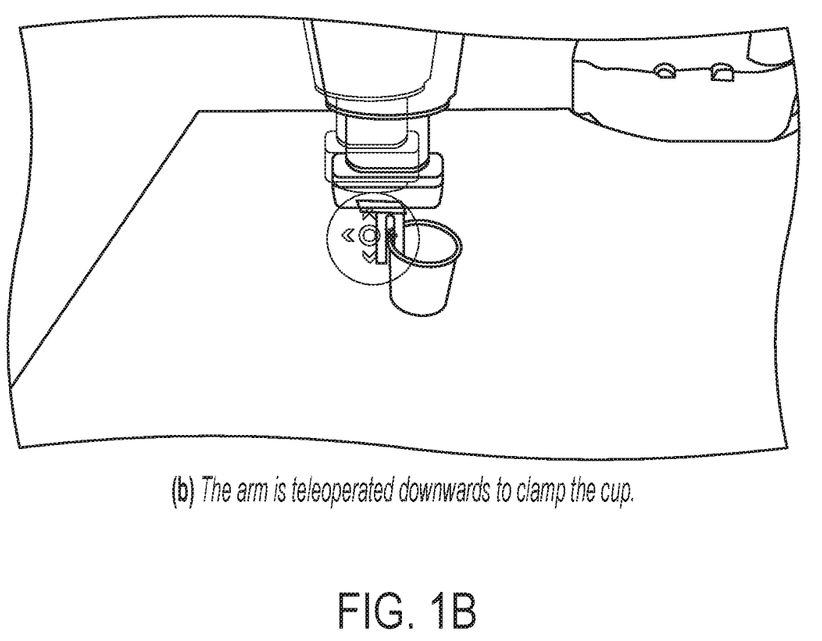
Figure 1C:
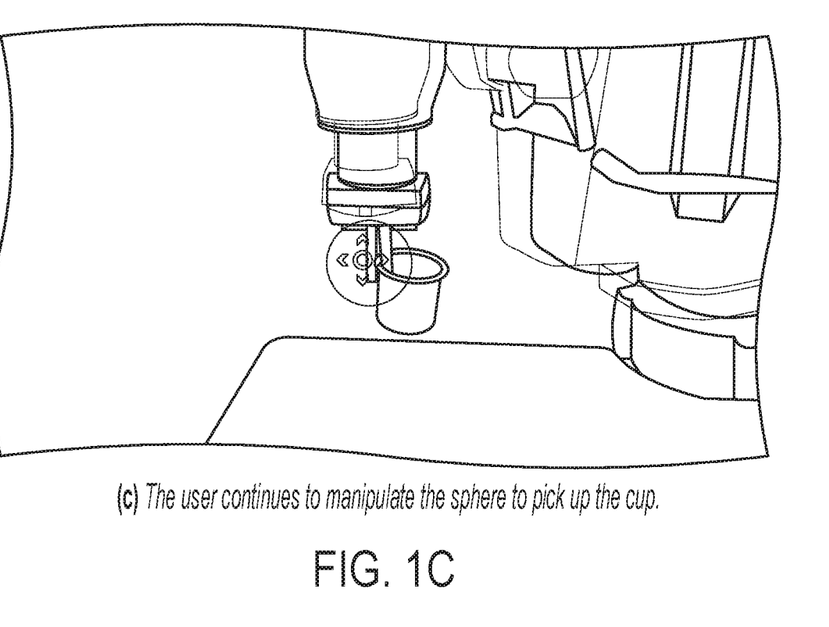

Once calibrated, a transparent sphere appears at the location of the of the end-effector as in FIG. 1A, FIG. 1B and FIG. 1C. The sphere acts as a controller for the end-effector. As a user moves the sphere in MR, the real gripper follows. As the arm moves, the shadow is updated. Tf and $Tf^{-1}$ are used to deal with change of coordinate systems. Our robot, referred to herein as "Baxter," is put into zero-gravity mode to ensure that the ending location of the sphere is the end location of the end-effector. Voice commands "open" and "close" can be used to toggle the gripper.

A teleoperation system can be used to collect demonstrations for learning. Using the key word "start" enables recording of the state over time. The (x, y, z) location in R is recorded after the robot has been moved and the corresponding gripper state is saved. We assume that the user is unskilled, and hence the each recorded position has default cp value 0. This signifies that the specific position is not important, but rather a point's relative position in the demonstration.

However, by clicking on the sphere during the demonstration, the user specifies that the particular position is important. To represent this the cp value associated with the position is set to 1. The notion of CPs becomes useful for demonstrating a fine motor skill in which exact placement is important. Alternatively, it is a helpful notion for someone who is unskilled and provides noisy demonstration. Being able to specify CPs allows the system to smooth out motion trajectories.

Figure 2A:
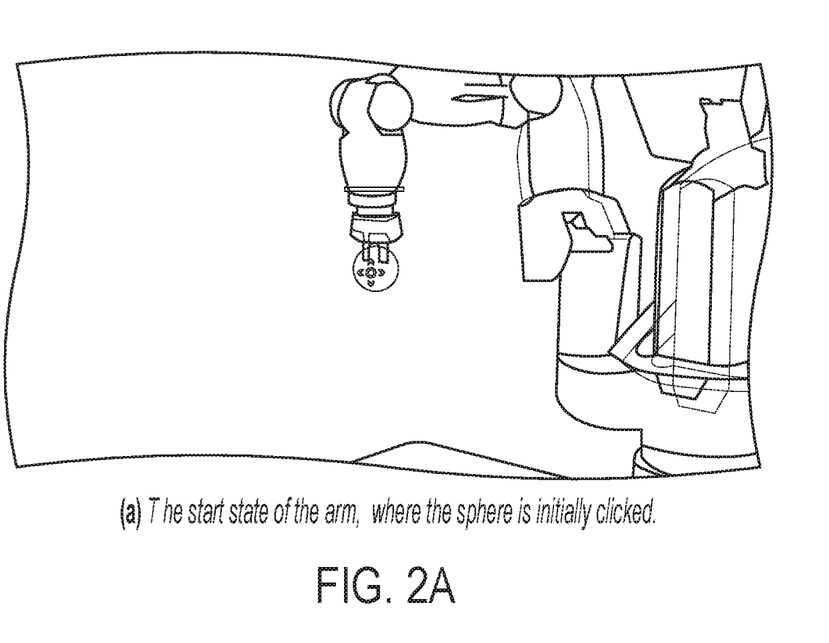
FIG. 2A, FIG. 2B and FIG. 2C illustrate three saved CPs over time.
Figure 2B:
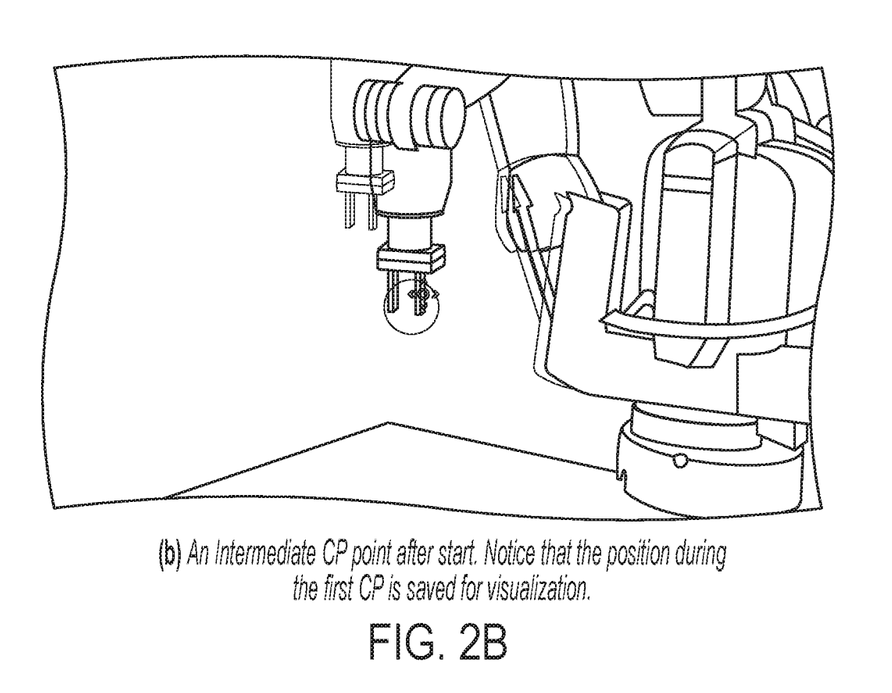
Figure 2C:
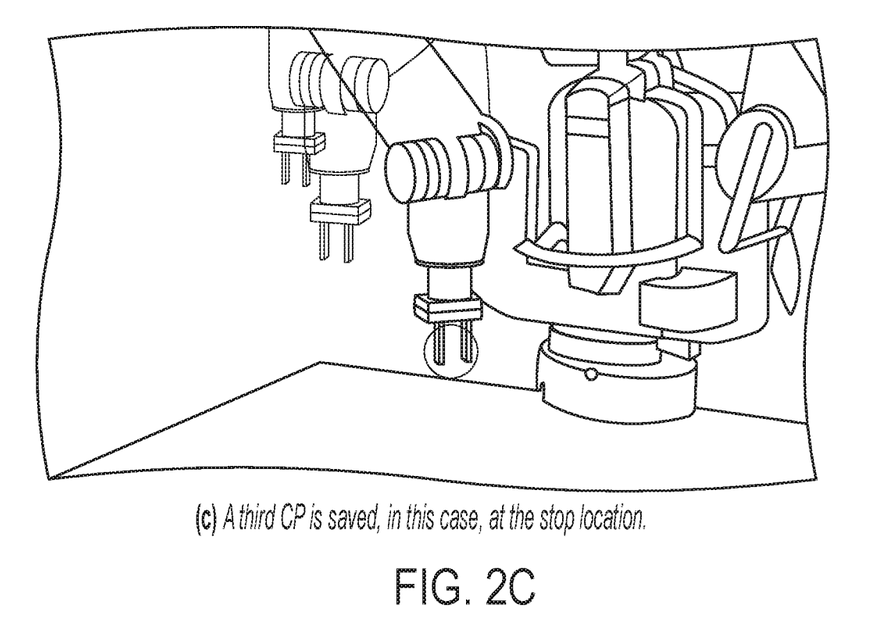

When the user clicks on the sphere a snapshot of the shadow is saved at the given time step as in FIG. 2A, FIG. 2B and FIG. 2C. The rendering of this shadow stays in the user's holographic vision to provide both a visual reminder of the CP and a marker that shows where the arm was in the past.

Figure 3:
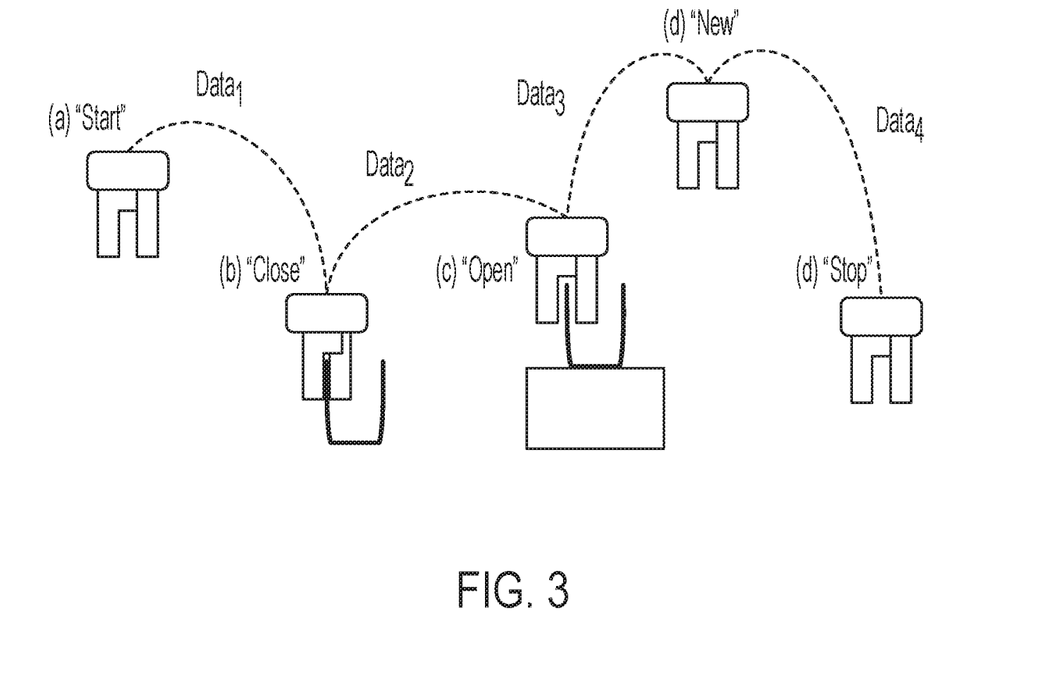
FIG. 3 illustrates an exemplary movement of a gripper over time and voice commands in quotation.

To make our system more robust to chained demonstrations, where a user wants to execute many skills that they deem different, we train several DMPs for various pieces of the demonstration. For example, FIG. 3 shows a 2D example of what different segments of a demonstration might look like. The user has the ability to start a new segment of a demonstration by using the voice command "new". When the user opens or closes the gripper during demonstration, it is automatically assumed that the system should start start an entry to store data for a new DMP. Each segment then has its own data points. The user says the word "stop" to indicate that they have finished their demonstration.

Data Processing

Instead of learning a DMP for each segment based on the raw data, we opt to do the following based on stored CPs. We start by parameterizing data points in each dimension (x, y, z) by time step for a given segment of the demonstration. Without loss of generality, we discuss the x dimension on the j-th segment. We get a function x (t) that is defined at integral points [1, . . . , n] where t=1 is the first time step and t=n is the n-th time step. We assume that the user provided us with with a noisy demonstration and only the positions that are specified as CPs need to be achieved. We define the residual in the standard way:

$$r_x(i)=x(i)-f_x(i), \quad (10)$$

where $r_x(i)$ is the i-th residual in the x dimension, i is the i-th time step, and $f_x$ is the function we are trying to approximate. The degree of $f_x$ is the minimum of (1) the number of CPs+1, (2) 10, and (3) n. We then use a weighted least square objective function to account for CPs. Our objective is to minimize the following error function $err_x$:

$$err_x = \left( \sum_{i=1}^{n} \frac{r_x(i)}{k_i} \right)^2. \quad (11)$$

Figure 4:
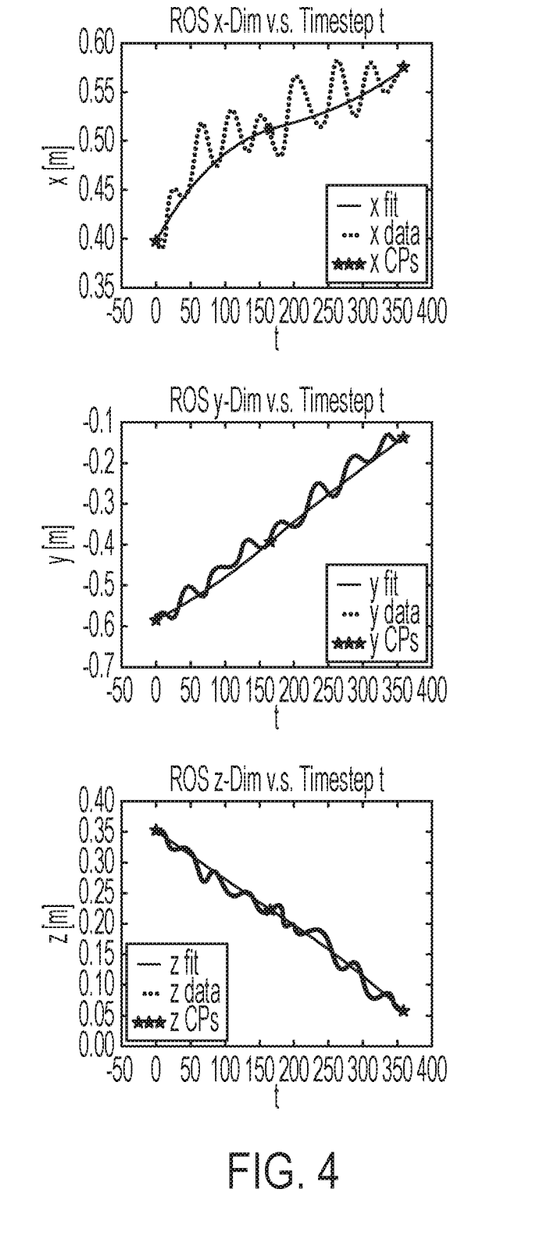
FIG. 4 illustrates exemplary graphs of noisy data from the demonstration in FIG. 2A, FIG. 2B and FIG. 2C.

Here $k_i$ takes value 0.01 if the user deemed the i-th position a CP and 1 otherwise. Hence error associated with CPs will be weighted more heavily and our minimization of $err_x$ will naturally result in a curve that is close to important parts of the demonstration. FIG. 4 shows an example of biased curve fitting to smooth over data for one DMP in all three dimensions. Three CPs have been chosen.

Once we have found $f_x$, $f_y$, and $f_z$. We pass our sequence of filtered data points ($f_x(i)$, $f_y(i)$, and $f_z(i)$) for i=1: n into a DMP solver which gives us a model for the segment, parameterized by a start and end state.

Execution

Figure 5:
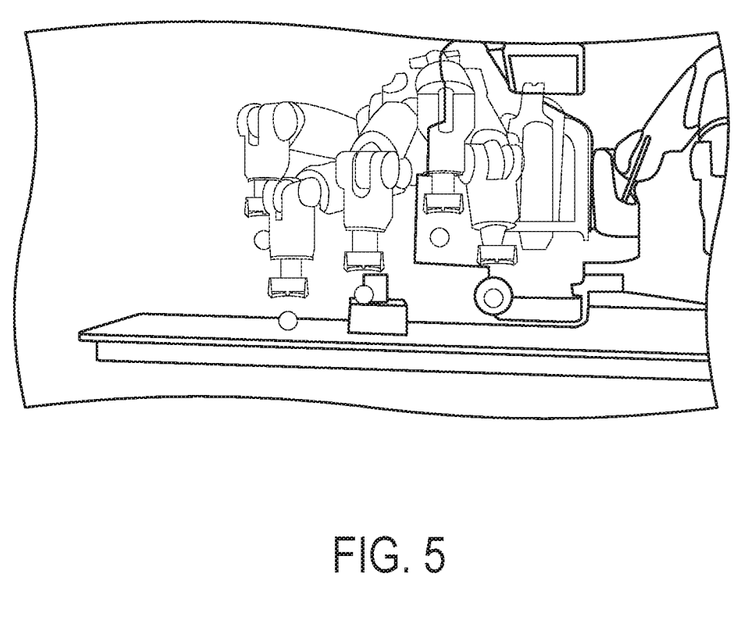
FIG. 5 illustrates an actualization of FIG. 3 after a similar training scenario.

After training, smaller spheres appear to the user, as shown in FIG. 5. These spheres take the position of the endpoints of segments of the demonstration. Between each successive pair of spheres there is a policy defined by the DMP. It is now possible for the user to perturb these spheres, perhaps to adapt to change in the real world. For example, if a user has trained the robot to pickup a cup, perhaps the location of the cup has changed. The system works in such a way that, in the general case, the end of one segment is the beginning of the next. The relative order of the actions is preserved. To execute the motion plan, the user says the command "execute", and the robot moves linearly to the start position to executes the DMP motion plans and gripper actions. The plans take roughly the same amount of time to execute as the demonstration itself.

System

Figure 6:
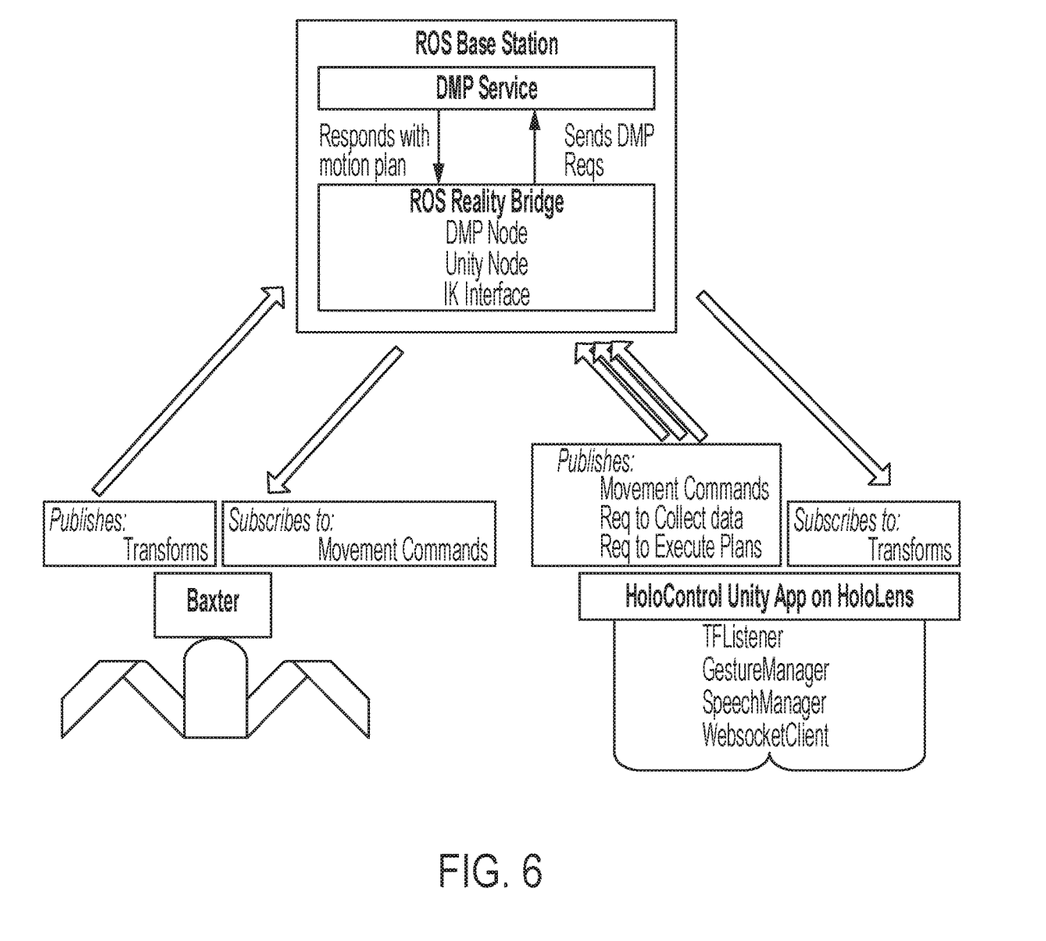
FIG. 6 illustrates a block diagram of an exemplary architecture of the system of the present invention.

An exemplary system architecture is shown in FIG. 6. During runtime, the system relies on communication between the Baxter robot and a HoloControl client via ROS Reality Bridge. All components are connected to the same network. ROS Reality Bridge is also responsible for making LfD request and handling data logging upon request from the client. It forwards all movement commands sent by the client to Baxter.

A HoloControl Application has five main components: the shadow mesh, WebsocketClient, TFListener, SpeechManager, and GestureManager.

The Unity rendering of the shadow is created by parsing a Unified Robot Description Format (URDF) of the Baxter. The WebsocketClient connects to the ROS Reality Bridge Server, which is an interface to the Baxter. The WebsocketClient marshals data and sends it to the bridge. The bridge publishes this information to the desired ROS topic. The bridge also forwards all messages via the Unity Node. The TFListener uses the WebscocketClient to subscribe to a transforms topic, which the Baxter publishes to when its joints move. When there is an update, the TFListener updates the shadow.

The SpeechManager is used to control the flow of the application and is critical for starting up the processes of collecting data and moving autonomously. It responds to various voice commands. Using the WebsocketClient, the SpeechManager publishes commands interpreted by the DMP Node and the Inverse Kinematics (IK) Interface running on the bridge. The SpeechManager sends commands to the DMP node to record arm state, create a data log for a new skill, and execute motion plans. The SpeechManager sends communicates with the IK interface to make the Baxter arm gripper open and close.

The GestureManager also sends messages used in both the DMP Node and the IK Interface. During normal teleopperation, every time the sphere is moved, its coordinates in R are sent to the IK Interface to update the arm. When HoloControl is in recording mode to collect a demonstration, messages are sent to the DMP node to record a trajectory and to save CPs as the user clicks.

A DMP Node responds to requests related to collecting demonstration data: end-effector position, gripper state, and CPs. When a skill is completed, it uses a data filter to fit a biased least square model through the skill data, as supported by the CPs. It then makes a request to the ROS DMP service to create a motion plan for the skill. After training and user parameter manipulation, the DMP Node executes each of the skill plans and publishes the resulting end-effect positions to move the arm autonomously.

Figure 7:
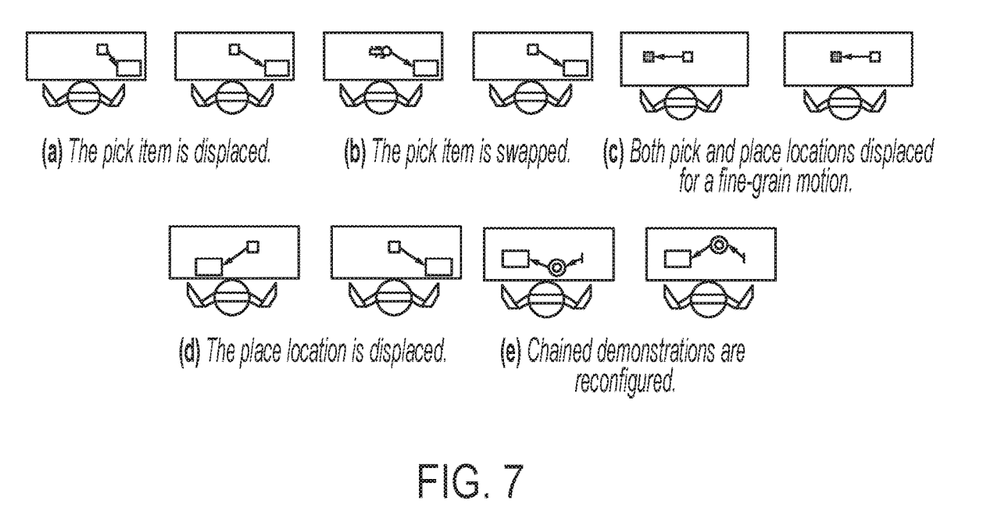
FIG. 7 illustrates exemplary diagrams showing various tasks.

We evaluated our MR LfD system on five pick and place tasks shown in FIG. 7. Our tasks determine the extent to which the manipulator could behave autonomously after training. A summary of our results can be found in Table 1.

Figure 8:
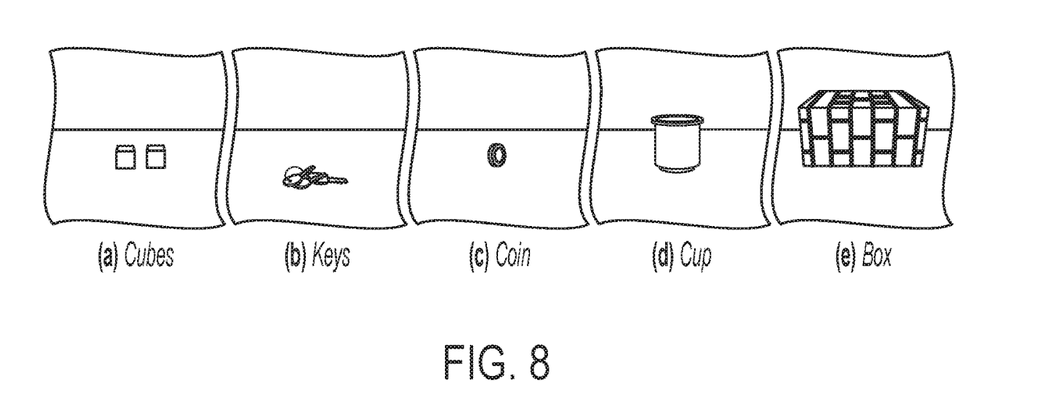
FIG. 8 illustrates various objects used for an exemplary demonstration.

For our pick and place tasks, we work with wooden cubes that have side length 2.54 cm, house keys that have maximum length 6 cm, a plastic coin with diameter 3.2 cm and thickness 0.3 cm, and a plastic cup with external diameter, height 7.62 cm and rim thickness 0.6 cm. We also use a 15.24 cm×15.24 cm×7.62 cm box as a raised square surface on which to place items. There is no stipulation about where on the box objects must be placed. FIG. 8 shows our objects.

For a given task, an expert demonstrator was asked to teleoperate the Baxter arm to achieve a training objective. After this initial demonstration, the user was asked to adapt the DMP segments to achieve a test objective. The train time (excluding calibration time), number of skills, adaptation time, and success rate of picks and places were recorded.

Exemplary Task Descriptions (a): Training: A cube is in front of the Baxter and must be placed on the box to the right of the cube. The cube must make contact with the box before it is released. Tape of thickness 2.54 cm was placed around the cube to make sure it could be returned to the same position. Testing: The cube is moved 10 cm to the right, and hence closer to the box. The goal is still to place the cube on the box.

(b): Training: In this case the training setup is the same as that of (a). Testing: The cube is replaced with three house keys on a ring. The location of the keys is roughly the same as that of the cube from training time.

(c): Training: Two cubes are placed 7.6 cm apart and in front of the Baxter. The rightmost cube must be picked and placed on top of the second cube. Testing: Both cubes are moved left by 5 cm and the right most cube is again to be placed on the second cube. The placement was considered a failure if the gripper knocked off the top block even after placing it.

(d): Training: In this case the training setup is the same as that of (a). Testing: The position of the cube does not change. However, the box is moved to the left of the cube and hence the place site changes.

(e): Training: A plastic coin and box are positioned in line; a cup is positioned in between them. The cup is at an angle with respect to the coin and the box such that it is farther away from the Baxter. The coin must be picked and dropped (not necessarily placed) in the cup. The cup must then be picked and placed on the box. Testing: The cup now forms an angle with the coin and the box such that it is closer to the Baxter. The sequence of sub-goals within the demonstration remains the same.

Exemplary Results (a): The training task took an average of 55.3 s over three trials using our system. In all three trials, the demonstration used three skills, with two CPs in the first and second skill and none in the third. In the first skill the trainer centered the end-effector over the cube, lowered the arm, and then closed the gripper around the cube. In the second skill, the trainer moved the arm over the box and then more slowly positioned the cube on the box. In the third skill, the arm was moved away from the place site.

During the tests, the user took an average of 18.9 s to move the endpoint spheres. The trainer noted that it was useful to have the tape surrounding the cube as a landmark to deal with calibration issues. The arm successfully picked up and placed the cube all three times, following the general motion from the training.

(b): The training time averaged 55.3 s, which was slightly faster than that of (a). This is perhaps because the trainer had already completed three trials of this training task to complete (a). The motions in these training trials looked like those in (a) with the same distribution of skills and Cps. The user opted not to move the endpoints, as the key was in roughly the same location as the cube. The keys were picked up successfully twice and placed on the box once. Due to the irregular nature of the keys, it was sometimes hard for the Baxter arms to pick up the keys. There were two different failure modes that were observed when placing the key on the box. First, when the gripper was not making a lot of contact with the keys, a slight jerk resulted in the keys slipping. Second, the keys were placed in such a way that they slipped off of the box. We believe that building a more intelligent system, which works based on visual feedback, and not just DMP endpoints will be more successful at this task.

(c): It took an average of 55.0 s to complete training. Because of the precise nature of this task, much of the time as spend placing the cube on top of the other cube. The user again opted to use 2 CPs for the pick up skill and 2 CPs for the place skill. No CPs were specified when moving the gripper away from the place site. During the first skill, the user consistently opted to reach a high position over the cube and then go downwards. After the pick, the end-effector was also move upwards to avoid hitting the adjacent place cube. An average of 38.7 s were used to move the two spheres defining the pick site at the first cube and the place site at the second cube. The user again noted that the tape around the blocks was a critical reference point for dealing with calibration issues. The pick task was successful all three times. However, the place task was never successful. We noticed two failure modes. In the first the cube was placed at an offset and hence fell off immediately. In the second, the cube was placed correctly initially, however, the process of the gripper moving away knocked the cube over.

(d): The training time took an average of 39.5 s. The motions in these training trials looked like those in (a) with the same distribution of skills and CPs. We note the apparent time benefit associated with frequently using our system. Adjustment time was also quick and took an average of 17.5 s. The user moved the place point and the end point of the demonstration, but not the start point. The pic was successful all three times, however, the place failed once. This failure mode occurred because the arm arced downwards, instead of upwards as in the demonstration, and hence made contact with the box before reaching the place site. This result seems to support the fact that DMP plans can be more error prone if start and end points are shifted significantly.

(e): The training task took 72.5 s on average. The user specified 2 CPs en route to pick up the coin and 2 more in getting above the cup. After the drop no CPs were specified when motioning to grip the cup. After this pick, two more CPs were specified in a large arc that put the cup in position on the box. After the cup was released, no CPs were specified to move the end-effector away from the cup. This pattern was consistent on all three trials.

Adjustment time took 32.0 s on average, and was focused on the drop point for the coin and the pick point for the cup. The coin was picked up all three times, which was expected considering this skill was essentially a replay of the demonstration. The drop and grab were also successful all three times. The place of the cup was successful only two out of three times. The failure mode was similar to that of (d), in that the arced path ended up approaching the cup place point from the bottom as opposed to the top.

TABLE 1

Result across the five tasks, showing the relative strengths and weaknesses of the system.

| Task Letter | Avg. Train Time [s] | Std. Train Time [s] | Num. Skills | Avg. Added Test Time [s] | Std. Added Test Time [s] | Frac. Picks | Frac. Place |
|---|---|---|---|---|---|---|---|
| a | 55.3 | 9.0 | 3 | 18.9 | 6.8 | 3/3 | 3/3 |
| b | 50.1 | 4.8 | 3 | 0.0 | 0.0 | 2/3 | 1/3 |
| c | 55.0 | 4.6 | 3 | 38.7 | 7.1 | 3/3 | 0/3 |
| d | 39.5 | 2.3 | 3 | 17.5 | 7.9 | 2/3 | 3/3 |
| e | 72.5 | 1.7 | 5 | 32.0 | 3.6 | 6/6 | 5/6 |

In summary, our MR LfD system uses holograms to control robot action. Our system serves as a simple interface to the robot and supports touch-free teleoperation of the robot arm. In our system, a user places a MR hologram of the robot on top of the real robot. The position of hologram is maintained by a HoloLens HMD. The user then moves a holographic sphere that appears on the robot end-effector and hence moves the real end-effectors. The user collects data for many skills within a demonstration. A different motion plan is created for each skill. Our system also supports CPs, which are key positions that are integral to the success of the demonstration. Data is processed using a bias least fit method, in which CPs are weighted more heavily. Separate DMPs are learned for each skill based on the filtered data. The user can then edit the endpoints of the skills and execute the motion plans.

The main advantages of our system are that it does not involve making contact with the robot, forces the user to pay attention to the robot, allows the user to quickly generalize a demonstration, and effectively chains many skills together.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed:

1. A system comprising:
a robot;
a ROS base station; and
a holocontrol client, the robot communicatively linked to the ROS base station and the ROS base station communicatively linked to the holocontrol client;
wherein the robot is configured to publish transforms and subscribe to movement commands;
wherein the ROS base station comprises:
a Data Management Platform (DMP) service; and
ROS reality bridge;
wherein the ROS reality bridge is configured to send DMP requisitions to the DMP service and receive a motion plan in return;
wherein the ROS reality bridge comprises:
a DMP node;
a unit node; and
an IK interface;
wherein the holocontrol client is configured to publish movement commands, requisitions to collect data, requisitions to execute plans and subscribe to transforms;
wherein the holocontrol client comprises:
a TFListener;
a GestureManager;
a SpeechManager; and
a WebsocketClient,
wherein the TFListener is configured to use the WebsocketClient to subscribe to a transforms topic; and
wherein the GestureManager is configured to send messages used in the DMP Node and the IK Interface.

2. The system of claim 1 wherein the SpeechManager is configured to send commands to the DMP node to record arm state, create a data log for a new skill, execute motion plans and communications with the IK interface to make the robot arm gripper open and close.

3. The system of claim 2 wherein the WebsocketClient is configured to marshal data and send it to the ROS reality bridge.

* * * * *